(12) United States Patent
Sakurai

(10) Patent No.: US 10,749,598 B2
(45) Date of Patent: Aug. 18, 2020

(54) INTEGRATED OPTICAL DEVICE

(71) Applicant: Santec Corporation, Aichi (JP)

(72) Inventor: Yasuki Sakurai, Aichi (JP)

(73) Assignee: Santec Corporation, Aichi (JP)

( * ) Notice: Subject to any disclaimer, the term of this patent is extended or adjusted under 35 U.S.C. 154(b) by 0 days.

(21) Appl. No.: 16/519,743

(22) Filed: Jul. 23, 2019

(65) Prior Publication Data

US 2020/0028587 A1 Jan. 23, 2020

(30) Foreign Application Priority Data

Jul. 23, 2018 (JP) ................. 2018-137753

(51) Int. Cl.
*H04B 10/00* (2013.01)
*H04B 10/079* (2013.01)
*H04B 10/43* (2013.01)
*H04B 10/2507* (2013.01)
H04J 14/00 (2006.01)

(52) U.S. Cl.
CPC ... H04B 10/07955 (2013.01); H04B 10/2572 (2013.01); H04B 10/43 (2013.01)

(58) Field of Classification Search
CPC ... G02F 2203/48; G02B 26/00; G02B 26/004; G02B 26/02; G02B 26/023
See application file for complete search history.

(56) References Cited

U.S. PATENT DOCUMENTS

| | | | |
|---|---|---|---|
| 2002/0018636 A1* | 2/2002 | Bischel | G02B 27/283 385/140 |
| 2003/0090807 A1 | 5/2003 | Morgan et al. | |
| 2005/0232570 A1* | 10/2005 | Ide | G02B 6/266 385/140 |
| 2008/0253731 A1 | 10/2008 | Wang et al. | |
| 2019/0146296 A1* | 5/2019 | Yeo | G02F 1/163 359/265 |

FOREIGN PATENT DOCUMENTS

| | | |
|---|---|---|
| JP | S52004248 A | 1/1977 |
| JP | H04070072 A | 3/1992 |
| JP | H09293921 A | 11/1997 |
| JP | 2004093750 A | 3/2004 |
| JP | 2004226501 A | 8/2004 |
| JP | 2005265901 A | 9/2005 |
| JP | 2007148309 A | 6/2007 |

* cited by examiner

*Primary Examiner* — Daniel G Dobson
(74) *Attorney, Agent, or Firm* — Osha Liang LLP

(57) ABSTRACT

An integrated optical device includes: a housing; a liquid-crystal optical power attenuator, an optical splitter, and an optical power monitor housed inside the housing; and first and second optical fibers housed inside the housing. The first optical fibers input an optical signal from outside the housing to the optical power attenuator. In a polarized state, the optical power attenuator attenuates the optical signal from the first optical fibers. The second optical fibers output the attenuated optical signal from the optical power attenuator to outside the housing. The optical splitter generates a split signal by splitting at least one of: the optical signal input to the optical power attenuator from the first optical fibers, and the attenuated optical signal propagated from the optical power attenuator to the second optical fibers. The optical power monitor receives the split signal and detects a power of the split signal.

10 Claims, 4 Drawing Sheets

INTEGRATED OPTICAL DEVICE

TECHNICAL FIELD

The present invention relates to an integrated optical device.

BACKGROUND

A device provided with a shutter-type optical power attenuator and an optical power monitor is known (for example, see patent literature 1). In this device, incident light from an optical fiber on an input side is attenuated by the shutter-type optical power attenuator and the attenuated light is output from an optical fiber on an output side. Moreover, a light quantity thereof is detected by the optical power monitor.

PATENT LITERATURE

[Patent Literature 1] US 2008/0253731 A1

Now, an optical communication device such as an optical transceiver or an optical transponder is built-in with various optical devices such as an optical power attenuator, an optical power monitor, and the like. A size of this optical communication device is restricted by standards such as CFP, CFP2, and CFP4, and size reduction is in demand.

To realize this size reduction, it is conceivable to use an integrated optical device that integrates an optical power attenuator and an optical power monitor in one space. However, a shutter-type optical power attenuator, which is often used in an optical communication device, has the following disadvantage.

That is, a shutter-type optical power attenuator attenuates light by vignetting a portion of the light. Because of this, an intensity distribution of the vignetted light, which is propagated to an optical fiber on an output side, is distorted from a circular shape due to diffraction.

In a situation of detecting this light by an optical power monitor, a photodiode that receives the light outputs a current proportional to a received optical power, regardless of a shape of the light. Meanwhile, the light output through the optical fiber on the output side corresponds to an overlap integral of an electric-field distribution of the light propagated in the optical fiber and an electric-field distribution of the light incident to the optical fiber.

Therefore, a power of the vignetted light propagated to the outside through the optical fiber on the output side—that is, an output optical power—does not correspond to the power detected by the optical power monitor. That is, in a method of detecting by an optical power monitor a power of light vignetted by a shutter-type optical power attenuator to control an output optical power by controlling the shutter-type optical power attenuator, there may be unfavorable monitoring precision of the output optical power.

Of course, this unfavorable monitoring precision does not arise if a power of the light actually being propagated through the optical fiber is detected. However, in this situation, the optical power monitor needs to be disposed in a position independent of and away from the optical power attenuator.

A situation similar to that of the shutter-type optical power attenuator also arises in a tilt-mirror optical power attenuator. A tilt-mirror optical power attenuator is configured to change a direction of reflected light by a tilt mirror to adjust a quantity of the reflected light coupled to an optical fiber on an output side.

SUMMARY

One or more embodiments of the present invention provide a high-performance integrated optical device provided with an optical power attenuator and an optical power monitor.

An integrated optical device according to one or more embodiments is provided with a housing, an optical power attenuator, an optical splitter, an optical power monitor, and first and second optical fibers. The optical power attenuator, the optical splitter, and the optical power monitor are housed inside the housing. The first and second optical fibers are at least partially housed inside the housing.

A liquid-crystal optical power attenuator is housed as the optical power attenuator inside the housing. The first optical fiber is disposed so as to input an optical signal from outside the housing to the optical power attenuator. The optical power attenuator is configured to attenuate the optical signal from the first optical fibers by an operation in a polarized state. The second optical fiber is disposed so as to output the attenuated optical signal from the optical power attenuator to outside the housing.

The optical splitter is disposed so as to generate a split signal by splitting at least one among the optical signal propagated from the first optical fiber to the optical power attenuator and the attenuated optical signal propagated from the optical power attenuator to the second optical fiber. The optical power monitor is disposed so as to receive the split signal and detect a power thereof.

In a situation of attenuating the optical signal by the operation in the polarized state by liquid crystals, the optical signal can be attenuated without distorting a beam shape, which is not the case with a shutter-type or tilt-mirror optical power attenuator. Because of this, the power of the optical signal output through the second optical fiber can be precisely observed by detecting the power of the split signal.

Therefore, according to one or more embodiments of the present invention, a high-performance integrated optical device provided with an optical power attenuator and an optical power monitor—specifically, an integrated optical device with excellent optical-power monitoring precision—can be provided.

According to one or more embodiments of the present invention, the optical splitter may be disposed so as to generate a first split signal by splitting the optical signal propagated from the first optical fiber to the optical power attenuator and to generate a second split signal by splitting the attenuated optical signal propagated from the optical power attenuator to the second optical fiber. In this situation, the integrated optical device can be provided with a first optical power monitor that receives the first split signal and detects a power thereof and a second optical power monitor that receives the second split signal and detects a power thereof as the optical power monitor.

According to the integrated optical device provided with the first and second optical power monitors, an input power and an output power of the optical signal can be precisely observed and light attenuation can be precisely controlled through a controller.

According to one or more embodiments of the present invention, the optical power attenuator is provided with a birefringent crystal and a liquid-crystal element and may be configured so a quantity of a returning light that passes through the birefringent crystal from the liquid-crystal element and is coupled to the second optical fiber changes according to a deflected state of the returning light. The birefringent crystal can be disposed so the optical signal from the first optical fiber passes therethrough. A drive voltage of the liquid-crystal element can be controlled by the controller. The liquid-crystal element can reflect the optical signal that passes through the birefringent crystal as the returning light to the birefringent crystal in the deflected state according to the drive voltage. In this situation, the attenuated optical signal corresponds to a portion of the returning light that passes through the birefringent crystal and is coupled to the second optical fiber.

According to one or more embodiments of the present invention, the optical signal from the first optical fiber can be converted into two mutually orthogonal linearly polarized components by the birefringent crystal. The liquid-crystal element may operate in a state of having a liquid-crystal orientation angle tilted 45 degrees relative to these two mutually orthogonal linearly polarized components.

According to one or more embodiments of the present invention, the optical power attenuator may be provided with first and second liquid-crystal elements as the liquid-crystal element. In this situation, the first liquid-crystal element may have a first liquid-crystal orientation angle tilted 45 degrees relative to the two linearly polarized components and the second liquid-crystal element may have a second liquid-crystal orientation angle that is tilted 45 degrees relative to the two linearly polarized components and is orthogonal to the first liquid-crystal orientation angle. By using such first and second liquid-crystal elements having orthogonal dispersion angles, a temperature dependence and a wavelength dependence of an optical response can be cancelled.

According to one or more embodiments of the present invention, the integrated optical device may be provided with first and second collimator lenses. The first collimator lens may be disposed between the first optical fiber and the birefringent crystal. The second collimator lens may be disposed between the second optical fiber and the birefringent crystal.

According to one or more embodiments of the present invention, the integrated optical device can be provided with the first and second collimator lenses so the optical signal from the first optical fiber is propagated to the liquid-crystal element through the first collimator lens and the birefringent crystal and the returning light from the liquid-crystal element is propagated to the second optical fiber through the birefringent crystal and the second collimator lens. The first and second collimator lenses improve freedom in designing a focal length and contribute to size reduction of the integrated optical device.

According to one or more embodiments of the present invention, the integrate optical device may be provided with an optical path conversion prism. The optical path conversion prism can be positioned between the first and second collimator lenses and the birefringent crystal. Specifically, the optical path conversion prism can be disposed so as to refract the optical signal from the first optical fiber that passes through the first collimator lens so as to pass through the birefringent crystal and head to the liquid-crystal element and refract the returning light from the birefringent crystal so this heads to the second collimator lens.

By disposing the optical path conversion prism in this manner, an optical path of the optical signal from the first optical fiber to the second optical fiber can be appropriately formed without abaxially using the first and second collimator lenses, enabling an effect of lens aberration to be suppressed.

According to one or more embodiments of the present invention, provided on a light receiving face of the optical power monitor may be an aperture that suppresses stray light from reaching the light receiving face and is for selectively irradiating the split signal to the light receiving face. The aperture may be integrated with the optical power monitor or may be an aperture that is independent of the optical power monitor. The aperture is useful in suppressing a power detection error due to stray light and in detecting the optical power of the split signal with high precision.

According to one or more embodiments of the present invention, the integrated optical device may be provided with a conversion circuit (convertor) that converts a DC voltage input from the controller into an AC voltage and the liquid-crystal element may be driven by the AC voltage applied from the conversion circuit.

DETAILED DESCRIPTION

Illustrative embodiments of the present invention are described below with reference to the drawings. An optical communication device 1 of one or more embodiments illustrated in FIG. 1 is provided with an integrated optical device 10 connected to an optical transmission line L and a controller 90 that controls the integrated optical device 10.

The integrated optical device 10 functions as an optical power attenuator. This integrated optical device 10 further has a function of respectively detecting powers of an input optical signal that is an optical signal from an upstream portion L1 of the optical transmission line L and an output optical signal that is an optical signal to a downstream portion L2 of the optical transmission line L. The controller 90 is configured to control, based on these detection signals, the power of the output optical signal relative to the input optical signal—in other words, an optical power attenuation rate by the integrated optical device 10.

Figure 1:
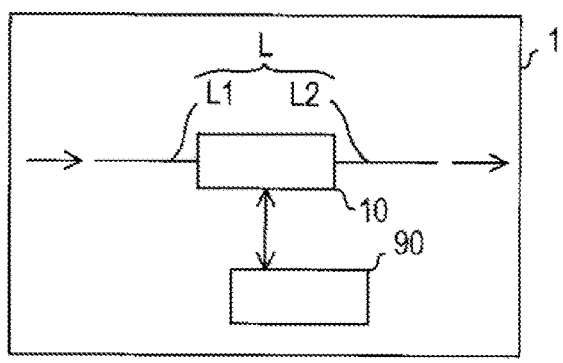
FIG. 1 shows a block diagram representing a schematic configuration of an optical communication device according to one or more embodiments including an integrated optical device.

FIG. 1 illustrates the optical communication device 1 provided with the single integrated optical device 10. However, the optical communication device 1 may be a multi-port communication device and may be provided with individual integrated optical devices 10 for optical transmission lines of each port. The optical communication device 1 is, for example, disposed on an optical communication network and is configured as, for example, an optical transceiver of the CFP standards.

Figure 2:
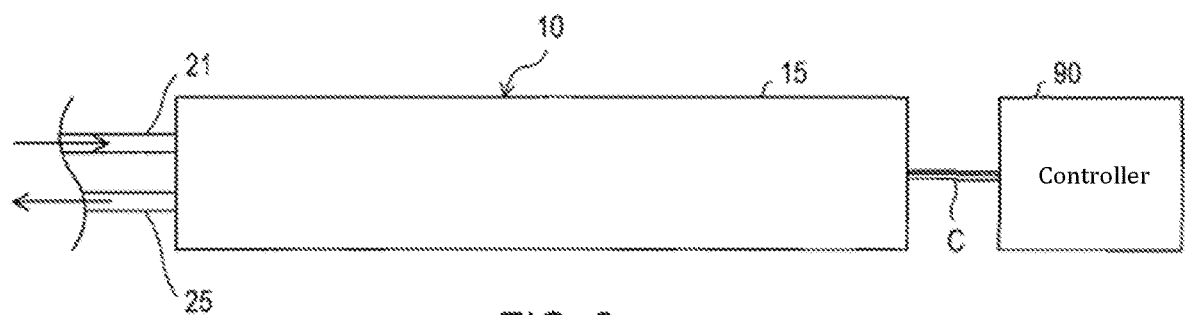
FIG. 2 shows a diagram illustrating an external configuration of the integrated optical device according to one or more embodiments.

Specifically, as illustrated in FIG. 2, the integrated optical device 10 is configured as a pigtail optical component. The integrated optical device 10 is configured so first optical fiber 21 for inputting an optical signal and second optical fiber 25 for outputting an optical signal are wired from inside a housing 15 to outside the housing through a first end portion of the housing 15, which has a substantially cylindrical shape with both ends substantially closed. In this manner, the first and second optical fibers 21, 25 are each wired so a portion thereof is housed inside the housing 15 and the remainder is disposed outside the housing 15.

These first and second optical fibers 21, 25 are wired in a horizontal direction perpendicular to a vertical direction in a form of being lined up in the vertical direction, which corresponds to the up-down direction in FIG. 2. The first and second optical fibers 21, 25 are, for example, held by capillaries that are not illustrated disposed inside the housing 15 and positioned inside the housing 15.

Figure 3:
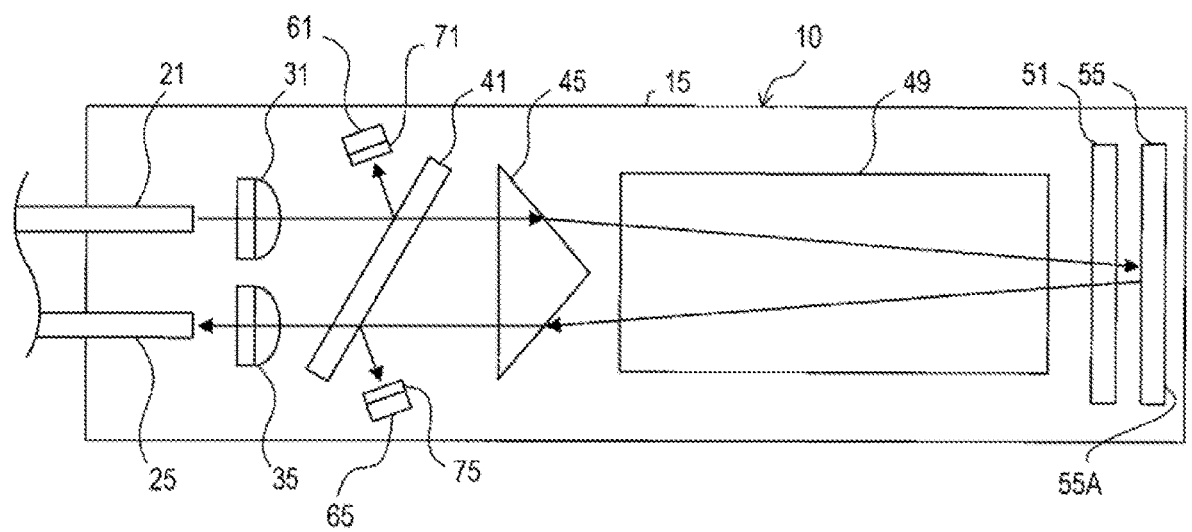
FIG. 3 shows a diagram illustrating component dispositions in a housing according to one or more embodiments when the integrated optical device is viewed from the side.

As illustrated in FIG. 3, further housed inside the housing 15 are first and second collimator lenses 31, 35; an optical splitter 41; an optical path conversion prism 45; a birefringent crystal 49; first and second liquid-crystal elements 51, 55; first and second optical power monitors 61, 65; and first and second apertures 71, 75. At a second end portion of the housing 15, various signal lines C (see FIG. 2) such as signal lines for transmitting detection signals from the first and second optical power monitors 61, 65 and a signal line for controlling the integrated optical device 10 are wired from inside the housing 15 to outside the housing.

The first collimator lens 31 is disposed on an optical path of the input optical signal between the first optical fiber 21 and the optical splitter 41. This first collimator lens 31 collimates the input optical signal from the first optical fiber 21 and transmits this downstream.

Specifically, to suppress an effect of lens aberration, the first collimator lens 31 is disposed so a center axis of the first collimator lens 31 matches an optical axis of the first optical fiber 21. By this, the input optical signal from the first optical fiber 21 is propagated downstream substantially through a center of the first collimator lens 31.

The second collimator lens 35 is disposed on an optical path of the output optical signal between the second optical fiber 25 and the optical splitter 41. The output optical signal from the optical splitter 41 is propagated to the second optical fiber 25 via this second collimator lens 35. Like the first collimator lens 31, the second collimator lens 35 is also disposed so a center axis of the second collimator lens 35 matches an optical axis of the second optical fiber 25. By this, the output optical signal from the optical splitter 41 is propagated to the second optical fiber 25 substantially through a center of the second collimator lens 35.

The optical splitter 41 is disposed between the first and second collimator lenses 31, 35 and the optical path conversion prism 45. Specifically, the optical splitter 41 is disposed to cross the optical path of the input optical signal between the first collimator lens 31 and the optical path conversion prism 45 and the optical path of the output optical signal between the optical path conversion prism 45 and the second collimator lens 35. This optical splitter 41 is configured as, for example, a plate-shaped member having a face formed with a tap film.

The optical splitter 41 splits the input optical signal from the first collimator lens 31 that passes through the optical splitter 41 into a transmitted signal and a reflected signal at a predetermined splitting ratio. In one or more embodiments, a small portion of the input optical signal is split into the reflected signal. Here, the reflected signal split from the input optical signal is expressed as a first split signal and the transmitted signal is expressed as an input optical signal, the same as before the split.

Likewise, the optical splitter 41 splits the output optical signal from the optical path conversion prism 45 into a transmitted signal and a reflected signal at a predetermined splitting ratio. Specifically, a small portion of the output optical signal is split into the reflected signal. Here, the reflected signal split from the output optical signal is expressed as a second split signal and the transmitted signal is expressed as an output optical signal, the same as before the split.

The first optical power monitor 61 is disposed on an optical path of the first split signal generated at this optical splitter 41, receives the first split signal, and detects a power thereof. Specifically, the first optical power monitor 61 can be provided with a photodiode on a light receiving face. The first aperture 71 is disposed on the light receiving face of the first optical power monitor 61, suppresses stray light from reaching the light receiving face, and is disposed to selectively cause the first split signal to pass through to the light receiving face.

Figure 4A:
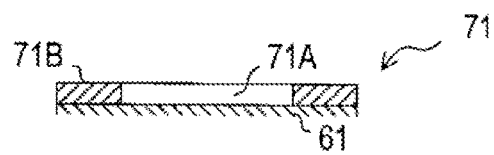
FIG. 4A shows a diagram representing a sectional configuration of an aperture along a direction perpendicular to a light receiving face.
Figure 4B:
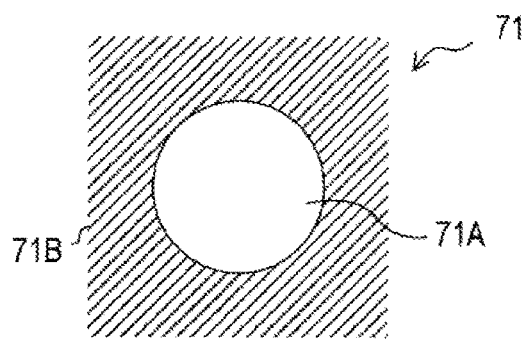
FIG. 4B shows a diagram representing a sectional configuration of the aperture along a direction parallel to the light receiving face, according to one or more embodiments.

Specifically, as illustrated in FIG. 4A and FIG. 4B, the first aperture 71 is configured as an opened plate having an opening portion 71A having an opening diameter corresponding to a beam diameter of the first split signal formed in a non-transparent member. The opening portion 71A is disposed on the optical path of the first split signal. By this configuration, the first aperture 71 selectively causes the first split signal to pass through to the light receiving face of the first optical power monitor 61 through the opening portion 71A and blocks stray light other than the first split signal by a non-transparent portion 71B surrounding the opening portion 71A so the stray light does not reach the light receiving face.

The second optical power monitor 65 is disposed on an optical path of the second split signal generated at the optical splitter 41 and is configured to receive the second split signal and detect a power thereof. Specifically, the second optical power monitor 65 can be provided with a photodiode on a light receiving face. The second aperture 75 is disposed on this light receiving face of the second optical power monitor 65, suppresses stray light other than the second split signal from reaching the light receiving face, and is disposed to selectively cause the second split signal to pass through to the light receiving face. Like the first aperture 71, the second aperture 75 is also configured as an opened plate having an opening portion having an opening diameter corresponding to a beam diameter of the second split signal formed in a non-transparent member. This opening portion is disposed on the optical path of the second split signal.

According to one example, the first and second apertures 71, 75 are disposed to respectively contact the light receiving faces of the first and second optical power monitors 61, 65. However, the first and second apertures 71, 75 are not limited to this example and may each be disposed away from the light receiving faces of the first and second optical power monitors 61, 65 or integrally formed with the first and second optical power monitors 61, 65. For example, the first and second optical power monitors 61, 65 may be configured to have a non-transparent layer that functions as an aperture patterned on the light receiving face. Forming the non-transparent layer may be realized by a semiconductor process.

The optical path conversion prism 45 is disposed between the optical splitter 41 and the birefringent crystal 49. Specifically, the optical path conversion prism 45 is disposed to cross the optical path of the input optical signal between the optical splitter 41 and the birefringent crystal 49 and the optical path of the output optical signal between the birefringent crystal 49 and the optical splitter 41.

This optical path conversion prism 45 is used to refract the optical signals according to a positional relationship between the first and second optical fibers 21, 25 disposed in different positions in the vertical direction and form the optical paths of the optical signals from the first optical fiber 21 to the second optical fiber 25.

This optical path conversion prism 45 converts the optical path of the input optical signal so the input optical signal advancing linearly in the horizontal direction from the first optical fiber 21 is refracted so as to have a predetermined angle relative to the horizontal direction and heads to the first and second liquid-crystal elements 51, 55 and converts the optical path of the output optical signal so the output optical signal from the birefringent crystal 49 is refracted and propagated parallel to the optical axis of the second optical fiber 25.

The birefringent crystal 49 separates the input optical signal that passes through the birefringent crystal 49 into two mutually orthogonal linearly polarized lights. Because of this, the input optical signal from the optical path conversion prism 45 is propagated to the first liquid-crystal element 51 as two linearly polarized lights of different optical paths separated through the birefringent crystal 49.

Figure 5:
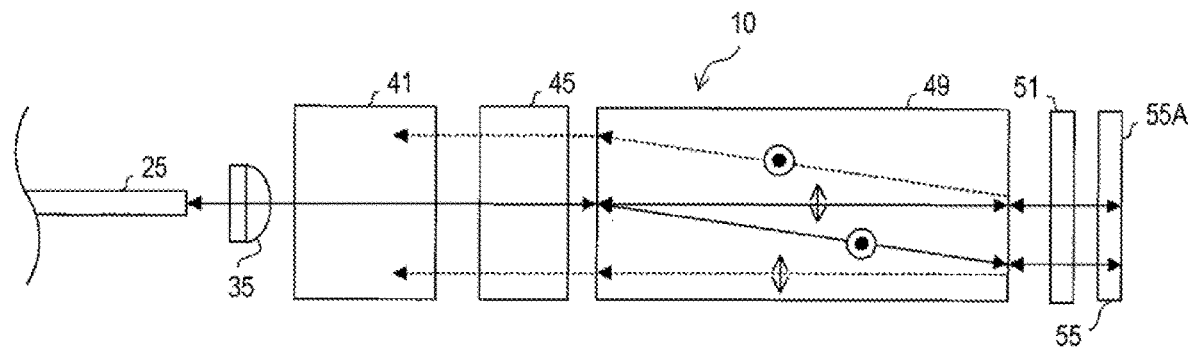
FIG. 5 shows a diagram illustrating the component dispositions in the housing according to one or more embodiments when the integrated optical device is viewed from below.

FIG. 5 illustrates using the solid lines the two linearly polarized lights corresponding to the input optical signal separating and reaching the first liquid-crystal element 51. Note that whereas FIG. 3 illustrates component dispositions inside the housing 15 as seen from the side of the housing 15, FIG. 5 illustrates the component dispositions inside the housing 15 when the housing 15 is viewed vertically—in particular, when viewed up from a lower side of the second optical fiber 25.

In FIG. 5, the arrows facing the second liquid-crystal element 55 represent propagation directions of the input optical signal and the arrows facing opposite the second liquid-crystal element represent propagation directions of the output optical signal. In FIG. 5, the short arrows facing up and down illustrate as an example an orientation of a first linearly polarized light and the white circles with the black dot in the middle illustrate as an example an orientation of a second linearly polarized light orthogonal to the first linearly polarized light.

Figure 6:
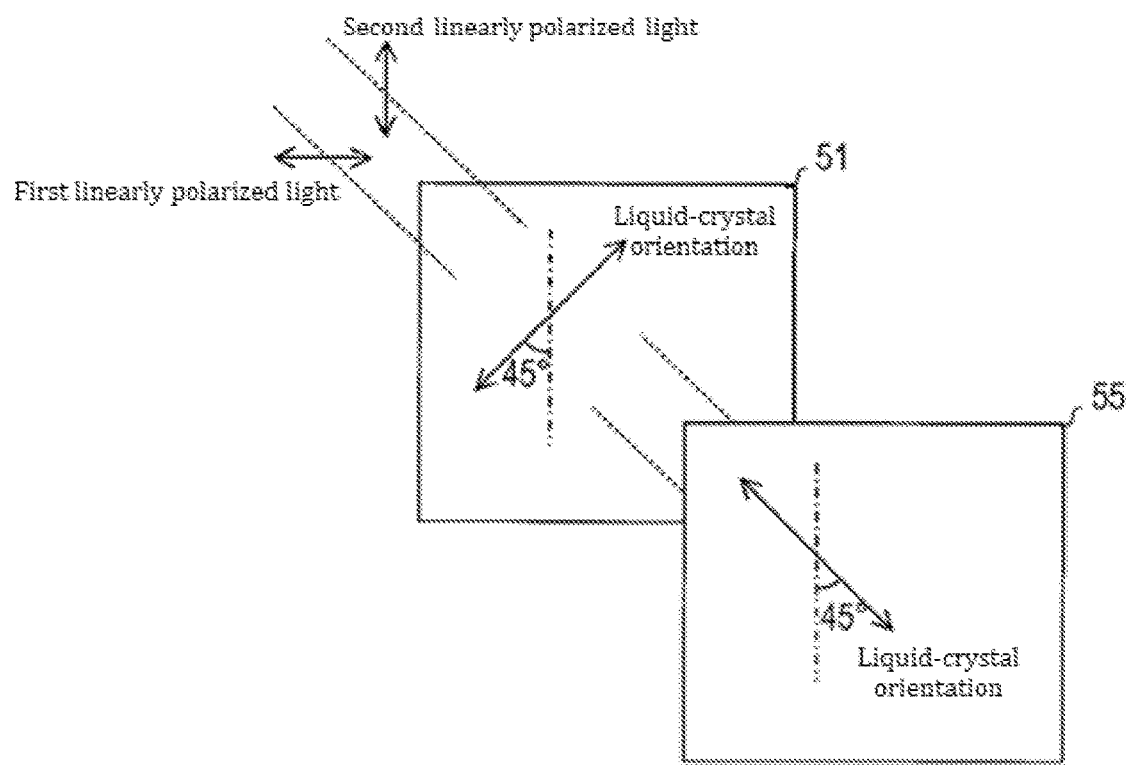
FIG. 6 shows an explanatory view relating to liquid-crystal orientation angles according to one or more embodiments.

The first liquid-crystal element 51 is disposed on the optical paths whereon the first and second linearly polarized lights that are the two linearly polarized lights corresponding to the input optical signal from the birefringent crystal 49 are propagated. Specifically, as illustrated in FIG. 6, the first liquid-crystal element 51 is disposed to have a first liquid-crystal orientation angle tilted 45 degrees relative to the first and second linearly polarized lights.

The second liquid-crystal element 55 is downstream of the first liquid-crystal element 51 and is disposed on the optical paths of the first and second linearly polarized lights that pass through the first liquid-crystal element 51. This second liquid-crystal element 55 is configured of the same liquid-crystal material having the same liquid-crystal layer thickness as the first liquid-crystal element 51. However, as illustrated in FIG. 6, the second liquid-crystal element 55 is disposed to have a second liquid-crystal orientation angle that is a liquid-crystal orientation angle tilted 45 degrees relative to the first and second linearly polarized lights and 90 degrees different from the first liquid-crystal element 51. The first liquid-crystal element 51 having the liquid-crystal orientation angle shifted 90 degrees from the second liquid-crystal element 55 is useful in cancelling a temperature dependence and a wavelength dependence of an optical response.

The second liquid-crystal element 55 is driven by a voltage amplitude designated from the controller 90. Moreover, the second liquid-crystal element 55 has a reflecting mirror 55A on a face facing an opposite side of the first liquid-crystal element 51. By this, the second liquid-crystal element 55 operates so as to convert the first and second linearly polarized lights into a polarized state corresponding to the voltage amplitude and reflect these as returning lights to the birefringent crystal 49. That is, according to one or more embodiments, the polarized state of the returning lights corresponding to the input optical signal is manipulated by adjusting the voltage amplitude of a drive voltage applied to the second liquid-crystal element 55, and this adjusts the attenuation rate of the output optical signal.

As illustrated in FIG. 5, when the returning lights that are the reflected lights from the second liquid-crystal element 55 of the input optical signal have the same polarized state as the input optical signal, in the birefringent crystal 49, they pass through the birefringent crystal 49 on the same paths as the input optical signal in terms of the horizontal direction and are propagated to an optical-path-conversion-prism 45 side (see the solid-line arrows in FIG. 5). In contrast, when the returning lights have a polarized state different from the input optical signal, in the birefringent crystal 49, they are propagated to the optical-path-conversion-prism 45 side via different paths from the input optical signal in terms of the horizontal direction (see the dashed-line arrows in FIG. 5).

That is, when the returning lights pass through the birefringent crystal 49, only a polarized component the same as the input optical signal included in the returning lights passes through the birefringent crystal 49 so as to be propagated on a normal optical path of the output optical signal, and a different polarized component is propagated off of the normal optical path of the output optical signal.

In this manner, the birefringent crystal 49 transmits only the same polarized component as the input optical signal among the returning lights as the output optical signal on the normal optical path and transmits the polarized component different from the input optical signal among the returning lights off of the normal optical path as a non-output optical signal.

By this function of the birefringent crystal 49, the input optical signal is attenuated according to an attenuation ratio corresponding to the voltage amplitude of the second liquid-crystal element 55 and transmitted to the optical path conversion prism 45 as an attenuated optical signal. That is, a portion of the returning lights corresponds to the output optical signal and is coupled to the second optical fiber 25 through the birefringent crystal 49. In this manner, in the integrated optical device 10 of one or more embodiments, a combination of the birefringent crystal 49, the first liquid-crystal element 51, and the second liquid-crystal element 55 functions as the optical power attenuator.

The output optical signal that passes through the normal optical path of the birefringent crystal 49 passes through the optical path conversion prism 45, the optical splitter 41, and the second collimator lens 35; is input to the second optical fiber 25; and propagated in the second optical fiber 25 to be output to the outside.

Figure 7:
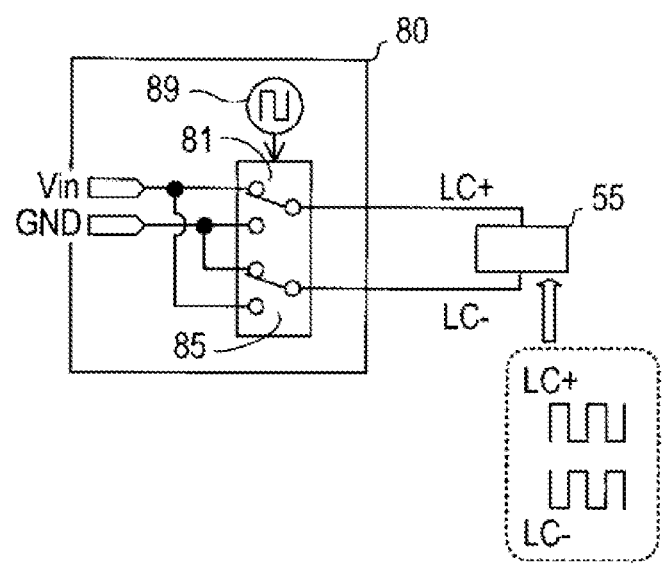
FIG. 7 shows a diagram representing a configuration of a drive circuit according to one or more embodiments.

Additionally, the second liquid-crystal element 55 is driven by being applied with a periodic AC voltage having an amplitude designated by the controller 90 by a drive circuit 80 illustrated in FIG. 7. This drive circuit 80 may be disposed inside the housing 15 of the integrated optical device 10 or disposed outside the housing 15 of the integrated optical device 10.

The drive circuit 80 is provided with switch circuits 81, 85 respectively connected to anode and cathode sides of the second liquid-crystal element 55, and the switch circuits 81, 85 alternately output at predetermined periods a DC voltage Vin set to a designated value of the voltage amplitude input from the controller 90 and a ground voltage GND according to a switch signal of a predetermined period output from an analog switch 89. By this, as illustrated in the dashed line in FIG. 7, an anode and a cathode of the second liquid-crystal element 55 are applied with a reverse-phase AC voltage having the voltage amplitude designated by the controller 90. In this manner, the second liquid-crystal element 55 is driven by the voltage amplitude designated from the controller 90.

A characteristic feature of the integrated optical device 10 of one or more embodiments described above is that the birefringent crystal 49 and the liquid-crystal elements 51, 55 configure the optical power attenuator. In one or more embodiments, in the situation of controlling the power of the optical signal coupled to the second optical fiber 25 by the operation in the polarized state of the optical signal by the liquid crystals, a distortion in a beam shape that arises in a situation of vignetting a portion of the optical signal by a shutter blade as in a shutter method or vignetting a portion of the optical signal by shifting a position of the optical signal relative to the optical fibers as in a tilt-mirror method can be suppressed.

That is, according to one or more embodiments, the polarized state of the optical signal can be manipulated by the second liquid-crystal element 55, the optical signal can be separated into the polarized components by the birefringent crystal 49, and it is possible to couple only a polarized component that is a portion of the optical signal to the second optical fiber 25. Therefore, unlike the shutter method and the tilt-mirror method, the optical signal can be attenuated and output from the second optical fiber 25 without distorting the beam shape.

Because of this, according to one or more embodiments, by detecting the power of the second split signal by the second optical power monitor 65, the power of the output optical signal output from the second optical fiber 25 can be precisely observed, enabling an optical-power monitoring precision when controlling the attenuation of the optical signal to be improved.

That is, whereas the second optical power monitor 65 outputs the detection signal having a current corresponding to the received power regardless of beam-shape distortion, the light output through the second optical fiber 25 corresponds to an overlap integral of an electric-field distribution of the light propagated in the optical fiber 25 and an electric-field distribution of the light incident to the optical fiber.

Because of this, in a situation where the beam shape is distorted, an error corresponding to the distortion arises between the power of the output optical signal estimated from the detection signal of the optical power monitor 65 and the actual power of the output optical signal propagated through the second optical fiber 25. The prior art is unable to suppress an effect of this error, and there is no linearity between the power detected by the optical power monitor (photodiode current) and the power of the output optical signal.

In contrast, according to one or more embodiments, because the beam shape is not distorted as in the shutter method and the tilt-mirror method, there is linearity between the power detected by the second optical power monitor 65 (photodiode current) and the power of the output optical signal and the power of the output optical signal can be accurately specified from the detection signal of the second optical power monitor 65.

Therefore, according to one or more embodiments, the monitoring precision of the optical power attenuated by the optical power attenuator can be improved. In particular, according to one or more embodiments, because the monitoring precision can be improved by a method of detecting the power of not the optical signal propagated through the second optical fiber 25 but the optical signal prior to being propagated through the second optical fiber 25, the monitoring precision can be improved while integrating an optical-power monitoring function and an optical-power attenuation function in one functional space.

Furthermore, in one or more embodiments, because the first and second apertures 71, 75 are provided on the light receiving faces of the first and second optical power monitors 61, 65, the returning lights straying from the normal optical paths due to the birefringent crystal 49 and diffusely reflected components arising at various component surfaces can be suppressed from being received at the first and second optical power monitors 61, 65, enabling a target optical power to be detected with high precision.

Therefore, one or more embodiments can provide a small, high-performance integrated optical device 10 that integrates an optical-power monitoring function and an optical-power attenuation function and has excellent optical-power monitoring precision and optical-power control precision.

It is needless to say that the present invention is not limited to the above embodiments and can adopt various embodiments. For example, in a situation where there is no need to cancel a temperature dependence and a wavelength dependence of an optical response, the first liquid-crystal element 51 does not have to be provided in the integrated optical device 10.

Instead of the first and second collimator lenses 31, 35, a single collimator lens may be provided in common. In this situation, because the input optical signal and the output optical signal come to pass through a position shifted from a center of the collimator lens, an effect of lens aberration needs to be considered.

Furthermore, the integrated optical device 10 does not necessarily need the first and second collimator lenses 31, 35. However, providing the first and second collimator lenses 31, 35 increases freedom in designing a focal length. This contributes to size reduction of the integrated optical device 10.

Various components, including the optical splitter 41 and the optical path conversion prism 45, are not limited to the illustrated forms. The optical splitter 41 and the optical path conversion prism 45 may be replaced with other optical components having equivalent functions. Optical-path conversion may be realized by disposing the optical axes of the collimator lenses and the optical axes of the optical fibers in a shifted manner.

Additionally, it is permissible for the integrated optical device 10 to provide only one among the first and second optical power monitors 61, 65. For example, it is permissible for the integrated optical device 10 to provide only the second optical power monitor 65 among the first and second optical power monitors 61, 65.

A function had by one component in any the above embodiments may be provided dispersed among a plurality of components. Functions had by a plurality of components may be integrated in one component. A portion of the configuration of one or more of the above embodiments may be omitted. At least a portion of the configuration of one or more of the above embodiments may be added to or substituted for any other configuration discussed-above. All technical ideas specified from the wording of the claims are part of one or more embodiments of the present invention.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 . . . optical communication device, 10 . . . integrated optical device, 15 . . . housing, 21 . . . first optical fiber, 25 . . . second optical fiber, 31 . . . first collimator lens, 35 . . . second collimator lens, 41 . . . optical splitter, 45 . . . optical path conversion prism, 49 . . . birefringent crystal, 51 . . . first liquid-crystal element, 55 . . . second liquid-crystal element, 61 . . . first optical power monitor, 65 . . . second optical power monitor, 71 . . . first aperture, 75 . . . second aperture, 80 . . . drive circuit, 90 . . . controller.

What is claimed:

1. An integrated optical device, comprising:
a housing;
a liquid-crystal optical power attenuator, an optical splitter, and an optical power monitor housed inside the housing;
an aperture disposed on a light-receiving face of the optical power monitor; and
a first optical fiber and a second optical fiber both housed inside the housing, wherein
the first optical fiber inputs an optical signal from outside of the housing to the optical power attenuator,
in a polarized state, the optical power attenuator attenuates the optical signal from the first optical fiber,
the second optical fiber outputs the attenuated optical signal from the optical power attenuator to the outside of the housing,
the optical splitter generates a split signal by splitting at least one of:
the optical signal input to the optical power attenuator from the first optical fiber, and
the attenuated optical signal output from the optical power attenuator to the second optical fiber, and
the optical power monitor receives the split signal and detects a power of the split signal.

2. The integrated optical device of claim 1, wherein the optical splitter generates:
a first split signal by splitting the optical signal input from the first optical fiber to the optical power attenuator, and
a second split signal by splitting the attenuated optical signal output from the optical power attenuator to the second optical fiber, and the integrated optical device comprises a plurality of the optical power monitor including:
a first optical power monitor that receives the first split signal and detects a power of the first split signal, and
a second optical power monitor that receives the second split signal and detects a power of the second split signal.

3. The integrated optical device of claim 1, wherein the optical power attenuator comprises:
a birefringent crystal wherethrough the optical signal from the first optical fiber passes; and
a liquid-crystal element that:
comprises a drive voltage controlled by a controller, and
reflects the optical signal that passes through the birefringent crystal as a returning light to the birefringent crystal in a deflected state according to the drive voltage, wherein
a quantity of the returning light that passes through the birefringent crystal from the liquid-crystal element and that is coupled to the second optical fiber changes according to the deflected state of the returning light, and
the attenuated optical signal corresponds to a portion of the returning light that passes through the birefringent crystal and that is coupled to the second optical fiber.

4. The integrated optical device of claim 3, wherein the birefringent crystal converts the optical signal from the first optical fiber into two mutually orthogonal linearly polarized components, and
the liquid-crystal element has a liquid-crystal orientation angle tilted 45 degrees relative to the two mutually orthogonal linearly polarized components.

5. The integrated optical device of claim 4, wherein the optical power attenuator comprises the plurality of liquid-crystal element that comprises a first liquid-crystal element and a second liquid-crystal element,
the first liquid-crystal element has a first liquid-crystal orientation angle tilted 45 degrees relative to the two linearly polarized components, and
the second liquid-crystal element has a second liquid-crystal orientation angle tilted 45 degrees relative to the two linearly polarized components and is orthogonal to the first liquid-crystal orientation angle.

6. The integrated optical device of claim 3, further comprising:
a first collimator lens disposed between the first optical fiber and the birefringent crystal; and
a second collimator lens disposed between the second optical fiber and the birefringent crystal, wherein
the optical signal from the first optical fiber is propagated to the liquid-crystal element through the first collimator lens and the birefringent crystal, and
the returning light from the liquid-crystal element is propagated to the second optical fiber through the birefringent crystal and the second collimator lens.

7. The integrated optical device of claim 6, further comprising:
one optical path conversion prism disposed between the first and second collimator lenses and the birefringent crystal, wherein the optical path conversion prism:
refracts the optical signal from the first optical fiber that passes through the first collimator lens to pass through the birefringent crystal and head to the liquid-crystal element, and refracts the returning light from the birefringent crystal so the returning light heads to the second collimator lens.

8. The integrated optical device of claim 3, further comprising:
a convertor that converts a DC voltage input from the controller into an AC voltage, wherein the liquid-crystal element is driven by the AC voltage.

9. The integrated optical device of claim 1, further comprising:
an aperture on a light receiving face of the optical power monitor, wherein the aperture:
is integrated with or independent of the optical power monitor,
suppresses stray light from reaching the light receiving face, and
selectively irradiates the split signal to the light receiving face.

10. An integrated optical device, comprising:
a housing;
a liquid-crystal optical power attenuator, an optical splitter, and a plurality of optical power monitors housed inside the housing; and
a first optical fiber and a second optical fiber both housed inside the housing,
wherein:
the first optical fiber inputs an optical signal from outside of the housing to the optical power attenuator,
in a polarized state, the optical power attenuator attenuates the optical signal from the first optical fiber,
the second optical fiber outputs the attenuated optical signal from the optical power attenuator to the outside of the housing,
the optical splitter generates:
a first split signal by splitting the optical signal input from the first optical fiber to the optical power attenuator, and
a second split signal by splitting the attenuated optical signal output from the optical power attenuator to the second optical fiber, and
the plurality of optical power monitors includes:
a first optical power monitor that receives the first split signal and detects a power of the first split signal, and
a second optical power monitor that receives the second split signal and detects a power of the second split signal.

* * * * *